US005213740A

United States Patent [19]

Fuller

[11] Patent Number: 5,213,740

[45] Date of Patent: May 25, 1993

[54] PROCESSES FOR THE PREPARATION OF TONER COMPOSITIONS

[75] Inventor: Timothy J. Fuller, West Henrietta, N.Y.

[73] Assignee: Xerox Corporation, Stamford, Conn.

[21] Appl. No.: 358,973

[22] Filed: May 30, 1989

[51] Int. Cl.[5] .......................... B29B 9/16; B29C 47/00

[52] U.S. Cl. .................................... 264/140; 264/141; 264/211; 264/211.19; 264/349

[58] Field of Search ........... 264/140, 141, 211, 211.12, 264/211.13, 211.19, 344, 349

[56] References Cited

U.S. PATENT DOCUMENTS

| | | | |
|---|---|---|---|
| 2,470,001 | 5/1949 | Stober | 523/351 |
| 3,467,634 | 9/1969 | Jacknow et al. | 526/279 |
| 3,526,533 | 9/1970 | Jacknow et al. | 428/403 |
| 3,640,861 | 2/1972 | Hsia | 264/140 X |
| 4,222,982 | 9/1980 | Beatty et al. | 264/143 |
| 4,233,388 | 11/1980 | Bergen et al. | 430/137 |
| 4,293,632 | 10/1981 | Dickerson et al. | 264/140 X |
| 4,298,672 | 11/1981 | Lu | 430/108 |
| 4,338,390 | 7/1982 | Lu | 430/106 |
| 4,379,825 | 4/1983 | Mitushashi | 264/344 X |
| 4,560,635 | 12/1985 | Hoffend et al. | 430/106.6 |
| 4,842,797 | 6/1989 | Matsumura et al. | 264/211 X |

FOREIGN PATENT DOCUMENTS

| | | | |
|---|---|---|---|
| 1183033 | 2/1985 | Canada . | |
| 59-230630 | 12/1984 | Japan | 264/141 |
| 1442835 | 7/1976 | United Kingdom . | |

OTHER PUBLICATIONS

English-language translation of Japanese reference 59-230,630.

*Primary Examiner*—Leo B. Tentoni
*Attorney, Agent, or Firm*—E. O. Palazzo

[57] ABSTRACT

A process for the preparation of particles which includes adding to a melt mixing apparatus at least two polymers, at least one of which is insoluble, incompatible or immiscible in the other polymer or polymers, and separating the incompatible polymer from the melt mixture. Also, a process for the preparation of toner particles which includes adding to a melt mixing apparatus, or to an extrusion apparatus at least two polymers, one of which is insoluble in the other polymer, and pigment particles, melt mixing or melt extruding the aforementioned polymers and pigments, and separating the incompatible polymer domains from the resulting mixture.

23 Claims, No Drawings

PROCESSES FOR THE PREPARATION OF TONER COMPOSITIONS

BACKGROUND OF THE INVENTION

The present invention is generally directed to processes for the preparation of particles, and more specifically to processes for the preparation of toner compositions. In one embodiment, the present invention relates to the economical preparation of particles, especially toner compositions with an average particle diameter of less than 20 microns, and preferably from about at least 3 to about 12 microns by the melt mixing, or coextrusion of at least two polymer components. Another embodiment of the present invention is directed to a simple economical one step process for the preparation of particles including dry and liquid toner compositions by the formation of rubbery, glassy, or semicrystalline domains in an incompatible continuous phase of a water soluble polymer by melt mixing, dissolving the aforesaid continuous phase with, for example, water or other suitable solvent, and recovering the resulting desired particles by, for example, filtration. Also, the present invention is directed to simple economical process for the preparation of toner particles from rubbery elastic nonjettable polymers in a manner, for example, wherein incompatible polymers are melt extruded or melt mixed such that one of the polymers becomes melt dispersed and segregated into toner sized domains in a continuous phase of water soluble plastic. When the continuous phase is dissolved with, for example, an alcohol or water, discrete ellipsoidal and/or spheroidal toner size particles remain of an average diameter of from about 3 to about 20 microns. Moreover, in a specific embodiment of the present invention there is provided a process for the preparation of particles, including toner particles, which comprises adding to an extruder or, for example, a BANBURY mixer two mutually insoluble polymers, one of which is soluble in a solvent such as an alcohol or water, and one of which is not soluble in the solvent, melt extruding or melt mixing the two polymers, thereby resulting in an incompatible continuous phase of the solvent soluble polymer, dissolution of the solvent soluble polymer in the solvent, and recovery of the insoluble polymeric product particles. The particles resulting from the process of the present invention can be selected as toner compositions when admixed with pigment particles, and are useful in xeromammography, especially those toner particles with an average diameter of about 8 microns, and the like. Also, the particles obtained with the process of the present invention can be selected for liquid ink development processes wherein small particles, for example with an average diameter of from about 3 to about 20 microns, can be selected to develop images; as ultra-low energy fusing, that is for example from about 50° to about 150° C., toners obtained from polymers with low glass transition temperatures; as small, for example with an average diameter of from about 3 to about 15 microns, particle pigment-polymer dispersions suitable for thermal ink jet systems; for obtaining toner particles for polymers too tough (for example, polyvinyl butyral) or with substantial rubbery characteristics; and medical diagnosis, affinity chromatography, membranes, cosmetics, prostheses, and the like. With the processes of the present invention for the preparation of toner particles, there is avoided the need for a jettable polymer. Jettable polymers include those with, for example, a glass transition temperature above the processing temperature, usually about 25° C. There is also provided in accordance with the present invention processes with positively or negatively charged toner compositions comprised of resin particles, pigment particles, optional additives including waxes, especially those with hydroxyl functionality, carboxyl functionality and charge enhancing additives. In addition, the present invention is directed to developer compositions comprised of the aforementioned toners, and carrier particles. Further, the processes of the present invention with the toner and developer compositions illustrated, including single component toners, enable reliable output copy quality and stable triboelectric charging properties for the toner compositions selected. Also, with the processes of the present invention low glass transition temperature polymers, semicrystalline polymers, and liquid polymers can be processed into small particles of from about 3 to about 15 microns.

Developer and toner compositions with certain waxes, and the preparation thereof are known. For example, there are disclosed in U.K. Patent Publication 1,442,835, the disclosure of which is totally incorporated herein by reference, toner compositions containing resin particles, and polyalkylene compounds, such as polyethylene and polypropylene of a molecular weight of from about 1,500 to 6,000, reference page 3, lines 97 to 119, which compositions prevent toner offsetting in electrostatic imaging processes and can be prepared by melt mixing processes. Additionally, the '835 publication discloses the addition of paraffin waxes together with, or without a metal salt of a fatty acid, reference page 2, lines 55 to 58. In addition, many patents disclose the use of metal salts of fatty acids for incorporation into toner compositions, such as U.S. Pat. No. 3,655,374. Also, it is known that the aforementioned toner compositions with metal salts of fatty acids can be selected for electrostatic imaging methods wherein blade cleaning of the photoreceptor is accomplished, reference Palmeriti et al. U.S. Pat. No. 3,635,704, the disclosure of which is totally incorporated herein by reference. Additionally, there are illustrated in U.S. Pat. No. 3,983,045 three component developer compositions comprising toner particles, a friction reducing material, and a finely divided nonsmearable abrasive material, reference column 4, beginning at line 31. Examples of friction reducing materials include saturated or unsaturated, substituted or unsubstituted, fatty acids, preferably of from 8 to 35 carbon atoms, or metal salts of such fatty acids; fatty alcohols corresponding to said acids; mono and polyhydric alcohol esters of said acids and corresponding amides; polyethylene glycols and methoxy-polyethylene glycols; terephthalic acids; and the like, reference column 7, lines 13 to 43.

Toner compositions can be prepared by rubber roll milling, (extrusion) melt blending, air jetting, spray drying, cryogenic attrition, melt dispersion, cold melting and attrition of swollen gels, controlled crystallization, melt congealing, encapsulation, in situ polymerization, sonification, filament grinding, heat spheroidization and the like. In extrusion process, there is generally added to an extrusion device polymer particles and pigment particles. There results strands of toner particles that are severed, and thereafter the particles are jetted and classified. With the process of the present invention, there are obtained toner size particles without jetting and if desired without classification thus avoiding further processing costs. Also, with the aforementioned melt mixing or extrusion processes there cannot usually be selected rubbery polymers with low glass transition temperatures, semicrystalline polymers, or tough polymers which do not fracture readily.

As a result of a patentability search, there were located U.S. Pat. Nos. 4,222,982 and 4,233,388 which illustrate the formation of toners by melt extrusion; U.S. Pat. No. 2,470,001 which discloses the use of an extruder as a mechanism for blending and working two ingredients; and Canadian Patent 1,183,033 which relates to the preparation of toners wherein, for example, two incompatible resins are melt blended, and wherein one resin forms a discontinuous phase with the other.

Other patents of interest which disclose toner compositions and the preparation thereof include U.S. Pat. Nos. 4,072,521; 4,073,649 and 4,076,641. Furthermore, references of background interest are U.S. Pat. Nos. 3,165,420; 3,236,776; 4,145,300; 4,271,249; 4,556,624; 4,557,991 and 4,604,338.

In U.S. Pat. No. 4,883,736 the disclosure of which is totally incorporated herein by reference, there are illustrated toner compositions, including magnetic single component, and colored toner compositions containing certain polymeric alcohol waxes, which toners can be prepared by known methods, including melt mixing by extruding, spray drying, and the like. More specifically, there is disclosed in the '736 Patent the elimination of toner spots or comets with developer compositions comprised of toner compositions containing resin particles, particularly styrene butadiene resins, pigment particles such as magnetites, carbon blacks or mixtures thereof, polymeric hydroxy waxes available from Petrolite, which waxes can be incorporated into the toner compositions as internal additives or may be present as external components, it being noted that with the processes of the present invention these additives are usually present as internal components; and optional charge enhancing additives, particularly, for example, distearyl dimethyl ammonium methyl sulfate, reference U.S. Pat. No. 4,560,635, the disclosure of which is totally incorporated herein by reference, Hodogaya Chemical TP-302 and Orient Chemical BONTRON P-51, and the like; and carrier particles. As preferred carrier components for the aforementioned compositions, there are selected steel or ferrite materials, particularly with a polymeric coating thereover, including the coatings as illustrated in U.S. Ser. No. 751,922, (now abandoned) entitled Developer Composition with Specific Carrier Particles, the disclosure of which is totally incorporated herein by reference. One particularly preferred coating illustrated in the aforementioned application is comprised of a copolymer of vinyl chloride and trifluorochloroethylene with conductive substances dispersed in the polymeric coating inclusive of, for example, carbon black. In one embodiment, disclosed in the aforementioned application is a developer composition comprised of styrene butadiene copolymer resin particles, and charge enhancing additives selected from the group consisting of alkyl pyridinium halides, ammonium sulfates, and organic sulfate or sulfonate compositions; and carrier particles comprised of a core with a coating of vinyl copolymers, or vinyl homopolymers. The polymeric components of the aforesaid application are also selected for various embodiments of the present invention as illustrated herein.

The preparation of toner and developer compositions containing charge enhancing additives, especially additives which impart a positive charge to the toner resin, are well known as indicated herein. Thus, for example, there is described in U.S. Pat. No. 3,893,935 the use of certain quaternary ammonium salts as charge control agents for electrostatic toner compositions. There are also described in U.S. Pat. No. 2,986,521 reversal developer compositions comprised of toner resin particles coated with finely divided colloidal silica. Further, there is illustrated in U.S. Pat. No. 4,338,390, the disclosure of which is totally incorporated herein by reference, developer and toner compositions having incorporated therein as charge enhancing additives organic sulfate and sulfonate compositions; and in U.S. Pat. No. 4,298,672, the disclosure of which is totally incorporated herein by reference, positively charged toner compositions containing resin particles and pigment particles, and as a charge enhancing additive alkyl pyridinium compounds, inclusive of cetyl pyridinium chloride. The aforementioned toners are prepared generally by melt mixing processes, rubber roll milling and extrusion.

Other prior art disclosing positively charged toner compositions and processes thereof, including melt mixing with charge enhancing additives, include U.S. Pat. Nos. 3,944,493; 4,007,293; 4,079,014 and 4,394,430.

Although the above described processes for the preparation of toner and developer compositions are useful for their intended purposes, there is a need for improved processes. More specifically, there is a need for processes wherein particles, especially toner particles, are obtained by a melt mixing process wherein jetting is avoided. Rather, with the process of the present invention there results toner size particles formed during melt mixing or extrusion. Also, there is a need for processes wherein rubbery elastic nonjettable polymers may be selected. Additionally there is a need for small, from about 3 to about 15 microns average diameter, toner particles of consistent size and shape suitable for mammography, liquid ink development, and high-resolution xerography, especially color xerography. Also, there is a need to process toners obtained from tough nonjettable materials (such as polyvinylbutyral) thereby, for example, increasing developer life as compared to several prior art toners.

SUMMARY OF THE INVENTION

It is an object of the present invention to provide processes for the preparation of particles, especially toner particles.

Another object of the present invention resides in the provision of simple economical processes for the preparation of particles by melt mixing or extrusion methods.

In another object of the present invention there are provided processes for the preparation of toner particles by the melt mixing, including extrusion, of at least two polymers.

Moreover, another object of the present invention relates to processes wherein toner compositions are prepared from a first polymer and a second polymer insoluble, immiscible or incompatible in the first polymer.

In another object of the present invention, there are provided processes wherein toner compositions and other particles are prepared from at least two polymers, one of which is substantially insoluble in water, or an alcohol.

Also, in another object of the present invention there are provided processes wherein toner compositions and other particles are prepared from at least two polymers, one of which is substantially soluble in water, or an alcohol such as polyethyloxazoline.

Additionally, in yet another object of the present invention there are provided processes for the preparation of toner compositions wherein rubbery elastic non-jettable polymers such as semicrystalline polymers are selected such as polyethylene acrylic acid, polyoctenamer, polypentene, other polyolefins, polycaprolactone, polyhexamethylene sebaccate, and the like. Additionally, in yet another object of the present invention there are provided processes for the preparation of toner compositions wherein glassy polymers such as styrene-butadiene copolymers, polyvinylbutyral, and other conventional toner polymers are selected.

Also, in another object of the present invention there are provided processes for the preparation of particles and toner compositions by melt mixing in, for example, a BANBURY mixer, or by extrusion wherein there results particles with an average diameter of from about 3 to about 15 microns.

Additionally, in another object of the present invention there are provided processes for the preparation of particles and toner compositions by melt mixing wherein there results ellipsoidal and/or spheroidal particles.

Furthermore, in still another object of the present invention there are provided methods to prepare dispersable particles suitable for liquid ink development, high resolution xerography, mammography, and the like. Moreover, the processes of the present invention permit tough, rubbery polymers with low glass transition temperatures which are not processable by jetting to be formed into toner particles.

Also, particles prepared as illustrated herein could be useful in cosmetics, affinity chromatography, clinical biochemistry for medical diagnosis, for the preparation of polymer foams, and in other applications requiring small particles, that is for example from about 3 to about 15 microns in average diameter.

These and other objects of the present invention are accomplished by providing processes for the preparation of particles including toner and developer compositions. More specifically, the present invention is directed to processes for the preparation of toner compositions, which comprises the melt mixing or extrusion of at least two polymers, at least one of which is insoluble in the other polymer, and which can then be separated from the other by extraction or some other known physical methods. In one embodiment of the present invention, the process comprises providing a first soluble polymer, a second polymer insoluble in the first and optional pigment particles, and effecting melt mixing, including extrusion thereof. In another embodiment of the present invention, and to facilitate particle extraction, a toner composition is prepared by a process which comprises adding to a melt mixing apparatus such as a BANBURY mixer, or an extruder a second polymer insoluble in, for example, water or an alcohol, a first polymer soluble in, for example, water or an alcohol, melt extruding the aforementioned polymers, thereby resulting in the formation of toner size domains of the insoluble polymer dispersed in an incompatible continuous phase of the solvent soluble polymer, dissolution of the solvent soluble polymer in a solvent such as water and the like, and recovery of the insoluble polymeric particles by, for example, filtration. Pigment particles such as carbon black can be added with the first and second polymer components, or these particles may be added subsequent to the completion of the process.

An embodiment of the present invention is directed to a process for the preparation of particles which comprises adding to an extrusion apparatus, or melt mixing apparatus at least two polymers, at least one of which is insoluble, incompatible or immiscible in the other polymer or polymers, and separating the incompatible polymer from the extruded mixture; and process for the preparation of toner particles thereof.

In a specific embodiment of the present invention, the following processes have been accomplished, and wherein the toners obtained were prepared via the melt extrusion/melt dispersion process indicated herein. A polyolefin such as styrene, 9 weight percent butadiene random copolymer polypentene, or a polycycloolefin such as polycyclooctene (a polyoctenamer available from Huls, Inc. as Vestenamer 8012) can be coextruded at between 100° and 150° C. with between 4 and 10 weight percent REGAL 330® carbon black, typically 16 weight percent of the magnetite MAPICO iron oxide and 2 weight percent of TP-302 charge control agent available from Hodogaya Chemical or Nachem Inc. A typical extrusion temperature is about 130° C. with a CSI Laboratory mixing extruder (Model CS-194FA-056) or a Haake small laboratory extruder. The extrudate is pulverized using a Waring blender or a Fitzmill, and then co-extruded with 75 weight percent of polyethyloxazoline (between approximately 30,000 and 50,000 weight average molecular weight obtained from Dow Chemical Company, or prepared by heating in bulk 1,000 grams of ethyl oxazoline and 6.6 grams of phenyloxazolium perchlorate catalyst at 110° C. until solidification). The extruded mixture is then pulverized with a blender or a Fitzmill, suspended in water (100 grams per liter), filtered, washed extensively with water and dried in vacuo. The resultant particles are then classified to less than 30 microns, treated with surface additives such as colloidal silica, including AEROSIL R972, in an amount, for example, of from about 0.1 to about 1 weight percent or a mixture of TP-302 and AEROSIL R972 (1.5 weight percent) and allowed to charge against a carrier comprised of a steel core with a polymeric coating thereover such as polyvinylfluoride/polyvinylidene chloride (PVF/PVC) (FP-461) carrier, or a carrier comprised of a ferrite core, such as a copper zinc ferrite with coatings thereover not in close proximity in the triboelectric series such as a double coating of a 70/30 KYNAR/polymethylmethacrylate. Usually the coating weight is from about 0.1 to about 5 weight percent, however, other coating weights can be selected. Depending on the carrier selected, and other similar factors the triboelectric charge of the toner can vary including preferably, for example, from about 10 to about 45 microcoulombs per gram as determined by the known Faraday Cage apparatus. Also, some of the particles were extensively characterized by Laysen cell particle size analysis, transmission electron microscopy and triboelectric carrier roll-up and blow-off analysis with standard Faraday cage methods as indicated herein.

Air jetted control samples of toners obtained by the process of the present invention in some embodiments possessed number average particle sizes between about 5 and about 12 microns and volume average particle size between about 8 and about 15 microns. The average of eight toner sample products prepared by the processes of the present invention in a specific embodiment were number average particles between about 2 and about 6 microns, and volume average particle sizes between about 6 and about 17 microns. More specifically, polyeicosene prepared by the process of the present invention had number average particle sizes between 2 and 5 microns, and volume average particle sizes of between 4 and 8.5 microns in one embodiment. Polystyrene-butadiene, polypentene, polytetradecene, syndiotactic poly 1,2 butadiene (JSR810), polyoctenamer (Huls Vestenamer 8012) and polytransisoprene (Polysar) obtained with the process of the present invention in one embodiment possessed respective number average and volume average particle sizes in microns of: 1.5 to 3 (number), 2.4 to 11.6 (styrene/butadiene (89/110); 1.72 to 4.8 (number), 4 to 12 (volume, polypentene); 2 to 6.7 (number), 6 to 16 (volume, polytetradecene); 2 to 8 (number), 7.7 to 18.8 (volume, syn. 1,2-polybutadiene); 4.4 to 17.6 (volume, polyoctenamer); and 2 to 6.7 (number), 12.8 to 29 (volume, polytrans isoprene). By comparison, a spray dried sample of polyhexadecene had 3.2 to 8.9 (number) and 7 to 19 (volume) micron diameter sizes. Hence, particles obtained by the melt extrusion/melt dispersion processes are similar to those obtained by spray drying and jetting methods. Costly equipment, however, is not required with the processes of the present invention. Also, samples of poly-1,2-butadiene and polyisoprene particles contained uniform carbon black dispersions in the matrix, whereas particle samples of polyethylene methacrylate, polypentene, polystyrene-butadiene and polyeicosene contained nonuniform carbon black dispersions in the matrix as determined by transmission electron microscopy.

When particles obtained with the process of the present invention are formulated with 10 weight percent REGAL 330® and 1.5 weight percent of the charge enhancing additive distearyl dimethyl ammonium methyl sulfate (DDAMS), the triboelectric charging value of the toner when roll milled against carrier particles comprised of a steel core with a coating thereover, 0.6 weight percent of 70/30 KYNAR/PMMA, for 1 hour was 14.2 microcoulombs per gram (2.49 percent T.C.) for polyisoprene, 13.9 microcoulombs per gram (2.6 percent T.C.) for polystyrene-butadiene, 9.13 microcoulombs per gram (1.5 percent T.C.) for polyoctadecene, and 5.41 microcoulombs per gram (0.83 percent T.C.) for polyhexadecene. These values were determined with standard Faraday cage/coulometer apparatus.

Illustrative examples of first water or alcohol insoluble polymer particles added to the melt mixing apparatus or the extruder in an effective amount of, for example, from about 10 to about 50 percent by weight include styrene acrylates, styrene methacrylates, styrene butadienes, polyesters, polyamides, epoxy resins, polyurethanes, polyolefins, vinyl resins and polymeric esterification products of a dicarboxylic acid; and a diol comprising a diphenol, polycyclo olefins, poly-1-olefins, polyethylene-acrylic acid and their esters; and the like. Virtually any suitable thermoplastic polymer can be selected for the process of the present invention provided this polymer is immiscible with the second, and one of the polymers is mutually extractable from the other. Various suitable vinyl resins may be selected as the first polymer including homopolymers or copolymers of two or more vinyl monomers. Typical vinyl monomeric units include styrene, p-chlorostyrene, unsaturated mono-olefins such as ethylene, propylene, butylene, isobutylene, and the like; vinyl chloride, vinyl bromide, vinyl fluoride, vinyl acetate, vinyl propionate, vinyl benzoate, and vinyl butyrate; vinyl esters such as esters of monocarboxylic acids including methyl acrylate, ethyl acrylate, n-butyl acrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, and butyl methacrylate; acrylonitrile, methacrylonitrile, acrylamide; vinyl ethers such as vinyl methyl ether, vinyl isobutyl ether, and vinyl ethyl ether; PLIOLITES; styrene butadiene copolymers, especially styrene butadiene copolymers prepared by a suspension polymerization process, reference U.S. Pat. No. 4,558,108, the disclosure of which is totally incorporated herein by reference; and mixtures thereof.

As one preferred toner polymer resin there can be selected the esterification products of a dicarboxylic acid and a diol comprising a diphenol, which components are illustrated in U.S. Pat. No. 3,590,000, the disclosure of which is totally incorporated herein by reference. Other preferred toner polymer resins include styrene/methacrylate copolymers, styrene/acrylate copolymers, and styrene/butadiene copolymers, especially those as illustrated in the aforementioned '108 patent; and styrene butadiene resins with high styrene content, that is exceeding from about 80 to about 90 percent by weight of styrene, which resins are available as PLIOLITES from Goodyear Chemical Company; polyester resins obtained from the reaction of bisphenol A and propylene oxide, followed by the reaction of the resulting product with fumaric acid; and branched polyester resins resulting from the reaction of dimethylterephthalate, 1,3-butanediol, 1,2-propanediol, and pentaerythritol. Preferred first polymers are styrene butadiene (89/11), styrene methacrylate (65/35), ethyleneacrylic acid copolymers (for example, Allied's ACLYNS, DuPont's SURLYNS), polycyclooctene (Huls); and poly-1-olefins, polypentene, epoxidized polycyclooctene, polyhexadecene, polyeicosene, syndiotactic poly-1,2-butadiene, polytransisoprene (Polysar), and the like.

Also, specific examples of first polymers with, for example, from about 10 to about 50 weight percent when ellipsoidal and spheroidal particles are desired based on the second polymer, usually polyethyl oxazoline, selected for the processes of the present invention are illustrated in U.S. Pat. No. 4,952,477 and copending U.S. Pat. No. 4,990,424, the disclosures of which are totally incorporated herein by reference. In the '477 patent, there is disclosed semicrystalline polyolefin polymers with a melting point of from about 50° to about 100° C., and preferably from about 60° to about 80° C. of the following formulas wherein X is a number of from about 250 to about 21,000; the number average molecular weight is from about 17,500 to about 1,500,000 as determined by GPC, and the $M_w/M_n$ dispersity ratio is from about 2 to about 15.

Polypentenes-$(C_5H_{10})X$ I.

Polytetradecene-$(C_{14}H_{28})X$ II.

Polypentadecene-$(C_{15}H_{30})X$ III.

Polyhexadecene-$(C_{16}H_{32})X$ IV.

Polyheptadecene-$(C_{17}H_{34})X$ V.

Polyoctadecene-$(C_{18}H_{36})X$ VI.

Polynonadecene-$(C_{19}H_{38})X$ VII.

and

Polyeicosene-$(C_{20}H_{40})X$ VIII.

Examples of specific first polymers selected for the processes of the present invention include semicrystalline polyolefin polymers poly-1-pentene, poly-1-tetradecene, poly-1-pentadecene, poly-1-hexadecene, poly-1-heptadecene, poly-1-octadene, poly-1-nonadecene, poly-1-eicosene, and the like. Other semicrystalline polyolefins can be selected, especially those with a melting point of from about 50° to about 100° C. and preferably from about 60° to 80° C., such as Allied ethylene-acrylic acid ACLYN polymers. Particles found with these materials and containing pigments and optional charge enhancing additives are particularly useful for liquid and dry electrophotographic, especially xerographic, imaging and printing processes.

Copolymers can also be selected as a first polymer providing they have the melting point as indicated, that is from about 50° to about 100° C. and preferably from about 60° to 80° C., which copolymers are formed from 2 monomers. Generally, the copolymers contain from about 80 to about 99.5 mole percent of the aforementioned polypentene monomer, and from about 0.5 to 15 mole percent of the polyolefin polymers of Formulas I through VIII illustrated herein. These copolymers usually consume less energy, that is for example their heat of fusion is less than the homopolymers, a high heat of fusion being about 250 Joules/grams; the heat of fusion being the amount of heat needed to effectively and permanently fuse the toner composition to a supporting substrate such as paper. In addition, the aforementioned copolymers generally possess a number average molecular weight of from about 17,000 to about 1,500,000, and have a dispersity $M_w/M_n$ ratio of about 2 to about 15. The semicrystalline polyolefins and copolymers thereof, and mixtures are available from a number of sources; and methods for the preparation of these compounds are illustrated in numerous published references, see for example U. Giannini, G. Bruckner, E. Pellino, and A. Cassacta, *Journal of Polymer Science*, Part C (22), pages 157 to 175 (1968); and K. J. Clark, A. Turner Jones, and D. G. H. Sandiford, *Chemistry in Industry*, pages 2010 to 2012 (1962), the disclosure of each of these articles being totally incorporated herein by reference. With mixtures, from about 75 to about 95 percent by weight of the polymer is selected, and from about 5 percent to about 30 percent by weight of the copolymer can be selected; however, other mixtures can be utilized providing the objectives of the present invention are achieved. Also, ethylene acrylic acid polymers, and related salts such as zinc, magnesium, sodium, and the like, available from Allied Chemical as ACLYN, can be selected as the first polymer for the processes of the present invention.

Examples of the second water or alcohol soluble polymer particles that may be added to the melt mixing apparatus, or the extruder in an effective amount of from, for example, about 50 to about 90 percent by weight, include phenolic novolacs or resoles, polyethylene oxide, polypropylene oxide, polystyrene-sulfonic acid, polyethyloxazoline, polyvinyl pyridine, polyvinyl pyrrolidone, and other similar low melting plastics, or semicrystalline materials incompatible with the aforementioned first polymers.

When preparing toner compositions, numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 2 percent by weight to about 20 percent by weight, based on the total weight of the toner composition, however, lesser or greater amounts of pigment particles can be selected providing the objectives of the present invention are achieved.

Various magnetites, which are comprised of a mixture of iron oxides (FeO.Fe2O3) in most situations, include those commercially available such as MAPICO BLACK, can be selected for addition to the toner compositions illustrated herein. The aforementioned magnetite particles are present in various effective amounts; generally, however, they are present in the toner composition in an amount of from about 10 percent by weight to about 75 percent by weight, and preferably in an amount of from about 15 percent by weight to about 55 percent by weight. Other magnetites not specifically disclosed herein may be selected. The aforementioned pigment particles can be added with the first and second polymers to the extrusion apparatus, or they may be added subsequent to the extrusion of the polymers. As preferred magnetites selected for the toner compositions for the processes of the present invention, the magnetites as illustrated in U.S. Pat. No. 4,517,268, the disclosure of which is totally incorporated herein by reference, are utilized.

A number of optional different charge enhancing additives may be selected for the toner compositions of the present invention to enable these compositions to acquire a positive or negative charge thereon of from, for example, about 10 to about 35 microcoulombs per gram. Examples of charge enhancing additives include alkyl pyridinium halides, especially cetyl pyridinium chloride, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; and other similar known charge enhancing additives, for example TP-302 available from Hodogaya, and Orient BONTRON P-51. These additives are usually incorporated into the toner in an amount of from about 0.1 percent by weight to about 15 percent by weight, and preferably these additives are present in an amount of from about 0.2 percent by weight to about 5 percent by weight.

Moreover, the toner composition can have present therein as internal or preferably as external components other additives such as colloidal silicas inclusive of AEROSIL (especially R972), metal salts of fatty acids, such as zinc stearate, metal salts, and waxy components, particularly those with a molecular weight of from about 1,000 to about 15,000, and preferably from about 1,000 to about 6,000, such as polyethylene and polypropylene, which additives are generally present in an amount of from about 0.1 to about 1 percent by weight. Also, ACLYNS available from Allied can serve as pigment dispersants and are usually selected in amounts up to 90 weight percent, and typically are present in amounts of from about 2 to about 20 weight percent.

Important characteristics associated with the toner compositions obtained by the process of the present invention include a triboelectric charge thereon of from about 5 to about 15 microcoulombs per gram, without charge enhancing additives, an average particle diameter of between about 3 to about 20 microns, and preferably 8 microns, a spherical shape, or an ellipsoidal shape with acceptable flow properties. With respect to the particles obtained with the process of the present invention, which particles after the addition of pigment, and optional additives, should they not be present as a component when the process of the present invention is initiated, are useful as indicated herein as dry high resolution xerographic toners, liquid inks, and low energy fusing toners (two component and single component). Preferred polymer resins selected for the aforementioned toners include polyeicosene, polyhexadecene, polyethylene-acrylic acids, polyoctenamer and styrene butadiene copolymers. Another embodiment of the present invention is directed to developer compositions comprised of the aforementioned prepared toners, or other toners obtained with the processes of the present invention; and carrier particles. Additionally, as indicated herein the toner compositions selected may include as additives, preferably external additives, in amounts, for example, of from about 0.1 to about 1.0 percent, and preferably 0.5 percent by weight of colloidal silicas such as AEROSIL R972, metal salts, metal salts of fatty acids such as zinc stearate, and the like, reference U.S. Pat. Nos. 3,720,617; 3,900,588 and 3,590,000, the disclosures of which are totally incorporated herein by reference.

Illustrative examples of carrier particles that can be selected for mixing with the toner compositions obtained by the process of the present invention, thus permitting two component developers, include those particles that are capable of triboelectrically obtaining a charge of opposite polarity to that of the toner particles. Accordingly, the carrier particles can be selected to be of a negative polarity thereby enabling the toner particles, which are positively charged, to adhere to and surround the carrier particles. Alternatively, there can be selected carrier particles with a positive polarity enabling toner compositions with a negative polarity. Illustrative examples of carrier particles that may be selected include steel, nickel, iron, ferrites, and the like. Additionally, there can be selected as carrier particles nickel berry carriers as disclosed in U.S. Pat. No. 3,847,604, which carriers are comprised of nodular carrier beads of nickel characterized by surfaces of reoccurring recesses and protrusions thereby providing particles with a relatively large external area. Preferred carrier particles selected for the present invention are comprised of a magnetic, such as steel, core with a polymeric coating thereover several of which are illustrated, for example, in U.S. Ser. No. 751,922 (now abandoned) relating to developer compositions with certain carrier particles, the disclosure of which is totally incorporated herein by reference. More specifically, there are illustrated in the aforementioned application carrier particles comprised of a core with a coating thereover of vinyl polymers, or vinyl homopolymers. Examples of specific carriers illustrated in the application, and particularly useful for the present invention are those comprised of a steel or ferrite core with a coating thereover of a vinyl chloride/trifluorochloroethylene copolymer, which coating contains therein conductive particles, such as carbon black. Other coatings include fluoropolymers, such as polyvinylidenefluoride resins, poly(-chlorotrifluoroethylene), fluorinated ethylene and propylene copolymers, terpolymers of styrene, methylmethacrylate, and a silane, such as triethoxy silane, reference U.S. Pat. No. 3,467,634 and 3,526,533, the disclosures of which are totally incorporated herein by reference; polytetrafluoroethylene, fluorine containing polyacrylates, and polymethacrylates; copolymers of vinyl chloride and trichlorofluoroethylene; and other known coatings. There can also be selected as carriers components comprised of a core with a double polymer coating thereover, reference U.S. Pat. Nos. 4,937,166 and 4,935,326, the disclosures of which are totally incorporated herein by reference. More specifically, there is detailed in these patents a process for the preparation of carrier particles with substantially stable conductivity parameters which comprises (1) mixing carrier cores with a polymer mixture comprising from about 10 to about 90 percent by weight of a first polymer, and from about 90 to about 10 percent by weight of a second polymer; (2) dry mixing the carrier core particles and the polymer mixture for a sufficient period of time enabling the polymer mixture to adhere to the carrier core particles; (3) heating the mixture of carrier core particles and polymer mixture to a temperature of between about 200° F. and about 550° F. whereby the polymer mixture melts and fuses to the carrier core particles; and (4) thereafter cooling the resulting coated carrier particles.

Also, while the diameter of the carrier particles can vary, generally they are of a diameter of from about 50 microns to about 1,000 microns, thus allowing these particles to possess sufficient density to avoid adherence to the electrostatic images during the development process. The carrier particles can be mixed with the toner particles in various suitable combinations, however, best results are obtained when about 1 to about 5 parts per toner to about 10 parts to about 200 parts by weight of carrier are mixed.

The toner and developer compositions of the present invention may be selected for use in developing images in electrophotographic imaging systems containing therein, for example, conventional photoreceptors, such as selenium and selenium alloys. Also useful, especially wherein there are selected positively charged toner compositions, are layered photoresponsive devices comprised of transport layers and photogenerating layers, reference U.S. Pat. Nos. 4,265,990; 4,585,884; 4,584,253 and 4,563,408, the disclosures of which are totally incorporated herein by reference, and other similar layered photoresponsive devices. Examples of photogenerating layers include selenium, selenium alloys, trigonal selenium, metal phthalocyanines, metal free phthalocyanines, and vanadyl phthalocyanines, while examples of charge transport layers include the aryl amines as disclosed in U.S. Pat. No. 4,265,990. Moreover, there can be selected as photoconductors hydrogenated amorphous silicon, and as photogenerating pigments squaraines, perylenes, and the like.

In the melt extrusion/melt dispersion process mentioned herein, and in one embodiment of the present invention, a water or alcohol insoluble polymer between about 10 and about 30 weight percent with or without carbon black, charge control agent and MAPICO BLACK, is co-extruded at between 130° and 150° C. with a water-soluble polymer such as polyethyloxazoline. The extrudate (between 10 and 50 grams) can then be chopped and stirred in 1 liter of water. The insoluble portion is isolated by filtration, washed with water and/or methanol and then either air or vacuum dried. Particles between 3 and 30 microns average particle diameter are isolated as a cake which break up readily by mechanical agitation. Surface additives can then be provided as indicated herein.

Toners obtained with the process of the present invention can be selected for various imaging and printing processes, including electrophotographic, such as xerography, and the like including liquid inks (as a dispersion in distillates such as the ISOPARS, like ISOPAR G), or as ink jet compositions (as a water dispersion).

The following examples are being submitted to further define various species of the present invention. These examples are intended to illustrate and not limit the scope of the present invention. Also, parts and percentages are by weight unless otherwise indicated.

EXAMPLE I

Preparation Of Poly-1-Pentene

Under nitrogen in a glove bag, titanium (III) chloride (1.8 grams, 9.2 millimols) was added to toluene (40 milliliters) in a 125 milliliter capacity amber sure-seal bottle (available from Aldrich, Inc.) equipped with a bakelite screw cap and elastomer liner. With a syringe, diethyl aluminum chloride (14 milliliters, 3.65 grams, 30.28 millimoles) was then added, followed by the rapid addition of 1-pentene (9.5 grams, 0.135 mol). The bottle was sealed and allowed to stand for 15 hours at 25° C. with occasional shaking. The reaction mixture was then heated for 5 hours between 40° and 45° C. in an oven. After cooling to 25° C., the mixture was treated with methanol to quench the reaction. Methanol (100 milliliters) containing concentrated hydrochloric acid (10 milliliters) was added and the resulting mixture was stirred in a blender. Additional methanol (200 milliliters) was added and blending was repeated. The polymeric top layer decanted from the methanol was washed with water in a blender until the water washes were clear. The resulting poly-1-pentene polymer was then washed with methanol, isolated by filtration and dried in an oven at 40° C. The yield was 7.27 grams (76.5 percent) of the above white polymeric product material which dissolved in warm toluene, and which polymer had a DSC melting point of 71° C. The melt viscosity for the polymer product in poise decreased gradually between 20,000 ($2\times10^4$) poise at 80° C. and 40,000 ($4\times10^3$) poise at 160° C. as determined with a Rheometrics Dynamic Viscometer operated at 10 radians per second. This compares with a conventional toner polymer styrene butadiene, 91 percent styrene, 9 percent butadiene with a melt viscosity that drops precipitously from 10,000 ($10^5$) poise at 100° C. to 4,000 ($4\times10^3$) poise at 160° C. The GPC molecular weight of the polymer product poly-1-pentene, which was determined in toluene, was Mw/Mn=16,600/20,000 ($2.\times10^4$). Also, the solution intrinsic viscosity for the polymer product was 0.851 in toluene at 25° C.

The above prepared polypentene (25 grams) was co-extruded with 10 weight percent REGAL 330® carbon black and 1.5 weight percent of the charge additive distearyl dimethyl amino methylsulfate using a C.S.I. laboratory extruder operated at 130° C. The extrudate was then chopped and co-extruded with 80 grams of polyethyloxazoline at 130° C. Thereafter, the co-extrudate was pulverized and stirred with 2 liters of water for two hours. Subsequently, the resulting mixture was filtered and the filter cake was washed with water and then methanol. After drying in vacuo, the filter cake was stirred using a coffee grinder and the resultant powder was percolated through 45 and 32 micron sieves to yield 3 to 7 micron (average volume diameter) particles (Laysen analysis) in 80 percent yield. Surface treatment with 1.5 weight percent AEROSIL R972 and TP-302 (available from Nachem Inc.) in a one to one mixture was developed xerographically using a Model D imaging test fixture machine as indicated hereinafter. Carrier particles mixed with the above prepared toner was comprised of a steel core with two coatings thereover of 70/30 KYNAR/PMMA at 0.6 weight percent coating weight. Subsequently, the above prepared developer (2.7 toner concentration) was incorporated into a Model D xerographic imaging test fixture with a selenium photoreceptor and there resulted, subsequent to the development and transfer of the latent images to paper, images of excellent quality with substantially no background deposits.

There was prepared a second developer composition by admixing the aforementioned formulated toner composition at a 4.5 percent toner concentration, that is 4.5 parts by weight of toner per 100 parts by weight of carrier, which carrier was comprised of a ferrite core, available from Tital Corporation, with a 0.6 weight percent polymeric coating, 70 percent by weight thereover of a terpolymer of styrene, methylmethacrylate, and triethoxysilane containing 20 percent by weight of VULCAN carbon black available from Pfizer, reference U.S. Pat. No. 4,517,268, the disclosure of which is totally incorporated herein by reference.

The aforementioned toner composition had a triboelectric charge thereon of a 15.5 microcoulombs per gram as determined by the known Faraday cage apparatus.

Further, a mixture 25 weight percent of polypentene and polyethyloxazoline were co-extruded by repeating the above procedure at 130° C. with a CSI extruder. The extrudate was then pulverized with a Waring blender and examined with a light microscope, which evidenced that the polypentene was dispersed in 1 to 20 micron spherical and ellipsoidal domains in the continuous polyethyloxazoline phase. Subsequent to the treatment of the aforementioned prepared mixture with water (1 liter per 25 grams of extrudate), the polyethyloxazoline dissolved and the polypentene particles were isolated by filtration. An infrared spectrum of the washed polypentene particles evidenced the total absence of polyethyloxayoline. Polyeicosene and polyoctenamer evidenced similar characteristics when the aforementioned process was repeated.

EXAMPLE II

One pound of styrene-butadiene (89/11) polymer was co-extruded with 10 weight percent BLACK PEARLS L carbon black and 20 weight percent of the magnetite MAPICO BLACK at 140° C. The extrudate was then chopped and co-extruded with 3.5 pounds of polyethyloxazoline (PEOX-50, 50,000 weight average molecular weight available from Dow Chemical Company) using the same extruder operated at 150° C. The extrudate was pulverized and stirred with 4 liters of water for 2 hours. The mixture was then filtered using 74 micron propyltex filter cloth (Tetko). The filter cake was washed with water and methanol and was then dried in vacuo. Thereafter, the resulting residue was chopped in a coffee grinder to break up the filter cake and the resultant powder was passed through a 32 micron sieve to yield 3 to 7 micron particles (average particle diameter) in 90 percent yield. Surface treatment of the toner powder with AEROSIL R972 and then one hour roll milling against the carrier of Example I provided the following results: at ½ weight percent AEROSIL the triboelectric charge on the toner was −0.53 microcoulombs per gram at 1.55 percent toner concentration; at 2 weight percent AEROSIL, the tribo was −7.88 microcoulombs per gram at 1.7 percent toner concentration; at 3.5 weight percent AEROSIL, the tribo was −17.56 microcoulombs per gram at 2.04 weight percent toner concentration; and at 5 weight percent AEROSIL, the tribo was −26.8 microcoulombs per gram at 1.61 percent toner concentration. When incorporated into a Model D imaging test fixture, substantially similar results were obtained as reported in Example I. An identical 8 micron average diameter toner prepared by air-jetting with a 1 weight percent surface treatment of AEROSIL had a tribo of (negative) −21.1 microcoulombs per gram at 2.07 percent toner concentration under the same conditions and with a standard Faraday cage/coulometer apparatus.

EXAMPLE III

Polycyclooctene (available from Huls Inc. with 80 percent of transpolycyclooctene) was melt extruded at 130° C. with 10 weight percent REGAL 330® carbon black and 16 weight percent of the magnetite MAPICO BLACK, and the extrudate was then ground up with dry ice using a Waring blender. The resulting dry particles were then mixed at 25 weight percent with polyethyloxazoline (PEOX-50, Dow) and re-extruded at 120° C. The extrudate was pulverized with a Waring blender and stirred with water (500 milliliters per 2 grams of solid). Methanol (5 milliliters) was added to control foaming. After two hours, the water insoluble particles were isolated by filtration using a 34 micron nylon filter cloth (Tetko), washed with water and methanol, and then dried in vacuo. The dried cake was ground up using a coffee grinder and classified by percolation through 45 and 34 micron sieves under vacuum with an Alpine cyclone collector. The yield of toner particles between 3 and 30 microns was 85 percent. Most of the particles were between 3 and 30 microns average particle diameter as determined with a Laysen particle size analysis. A sample of the toner powder (2 grams) was surface treated with 0.12 gram of a 1:1 weight ratio of AEROSIL R972 and TP-302 charge control additive (available from Nachem).

A developer composition was prepared by repeating the procedure of Example I, and wherein (60 grams) of the carrier with a coating comprised a first polymer of KYNAR, 70 weight percent and a second polymer of polymethylmethacrylate, 30 weight percent, 0.6 weight percent coating weight was mixed with the above prepared toner. This developer was then selected to cascade develop latent images present on a selenium photoreceptor in a Model D imaging test fixture. A Xerox 5028 silicone fuser roll was used to fix the toner to paper. The triboelectric charge of the polycyclooctene toner when rolled against the carrier of Example I (70/30 KYNAR polyvinylidene fluoropolymer/PMMA-polymethylmethacrylate carrier) was as follows: 9.66 microcoulombs per gram at 3.98 percent toner concentration, 17.8 microcoulombs per gram at 2.76 percent toner concentration, and 11.84 microcoulombs per gram at 2.58 percent toner concentration. Polytransisoprene when treated similarly had a tribo against 70/30 KYNAR/PMMA carrier of 8.73 microcoulombs per gram at 2.84 percent toner concentration. The tribo for polyhexadecene toner prepared similarly was 6.69 at 1.22 percent toner concentration with the two polymer coated carrier of Example I.

EXAMPLE IV

Toners were prepared by repeating the melt extrusion/melt dispersion process described in Example III with the following materials in place of polycyclooctene as the first polymer:

There was selected the following first polymer with polyethyloxazoline as the second water soluble polymer:

polycyclodecene
polycyclododecene
5 to 100% expoxidized polycyclooctene
potassium permanganate oxidized polycyclooctene
syndiotactric 1,2-polybutadiene (JSR810)
polyeicosene
polyoctadecene
polyhexadecene
polytetradecene
ELVAX 5720
polyethylene-acrylic acid (Allied Aclyns: 540, 580, 143, 5120, 201A, 246, 272A, 276A, 262A, 285A, 293A, 295A, 290, 291, 299, 226
polytransisoprene (Polysar)
polyethylene methylacrylate (Chevron)
polycaprolactone
polyhexamethylene sebaccate
polyvinylbutyral
polystyrene-pentene
poly n-butyl methacrylate
polyethylene
polyurea
polyamide resin
a branched polyester
polyhexadecene-25 weight percent undecylenol
polyhexadecene-25 weight percent undecylenic acid
polyethylene-octadecene
polystyrene-maleic anhydride copolymer
100% epoxidized polyheptenamer
polyethylene methacrylic acid (Aldrich)
polyethylene-vinylacetate (Aldrich)
PLIOLITE (available from Goodyear)
PLIOTONE (available from Goodyear)
styrene-butadiene block polymers
poly (1,4-butylene adipate)
polyethyleneimine (linear)
poly (3-hydroxy butyric acid)-poly (3-hydroxy valeric acid)copolymer
poly (isobutyl methacrylate)
polystyrene
polyvinylacetate
polyvinylstearate.

There resulted particles in each instance with average diameters of between about 3 to about 15 microns.

Toner and compositions were prepared with each of the above prepared particles by repeating the procedure of Example III with substantially similar results.

EXAMPLE V

Polyethylene oxide and polyvinyl pyrrolidone were selected to replace polyethyloxazoline in Example III, and toner and developer compositions were prepared by repeating the process of Example III. The polyethyloxazoline particles isolated were uniform in size, that is they were between from about 3 to about 15 microns average particle diameter.

EXAMPLE VI

ELVAX 5720 (100 g, ethylene-methacrylic acid polymer, available from E. I. DuPont Chemical Company) and 20 weight percent MOGUL L carbon black (Cabot Corp.) were melt extruded at 120° C. using a CSI Mixing Extruder (Model CS-194FA-056). The extrudate was then chopped and melt extruded at 120° C. with 75 weight percent polyethyloxazoline. The mixture was then pulverized using a Waring blender and stirred with 2 liters of water. The resulting toner particles were then isolated by filtration and dried in a vacuum oven. Thereafter, these particles were then classified by allowing the toner to percolate through two sieves (45 and 32 microns) under vacuum. The sieved sample had average diameter particle sizes between about 3 and 7 microns. The toner particles were then suspended in 98 weight percent ISOPAR L (Exxon) and a 10 weight percent solution of basic barium petronate (CCA) in ISOPAR L was used to charge the ink at the three concentration levels, 15, 30 and 45 milligrams of charge control agent (CCA) per gram of ink solids. The charge to mass (Q/m) for this ink was measured using a standard deposition cell and compared to control ink prepared by heating ELVAX 5720 (100 grams) with 20 weight percent of MOGUL L carbon black, and 98 weight percent of ISOPAR L until a homogeneous mixture was formed with a steel shot attritor followed by continued attrition for 48 hours at room temperature (25° C.). At 15 milligrams/gram (CCA), the Q/m=33.8 vs. 90 for the control; at 30 milligrams/gram CCA, Q/m=54.6 versus 137.4 for the control; and at 45 milligrams/gram of the charge control additive aluminum stearate, Q/M=88.1 versus 200 microcoulombs per gram for the control. The mass per time (milligrams/second) ratios were 57.3, 67.5 and 45, respectively, compared with 50, 65.5 and 45 for the control samples.

Other modifications of the present invention may occur to those skilled in the art subsequent to a review of the present application. The aforementioned modifications, including equivalents thereof, are intended to be included within the scope of the present invention.

What is claimed is:

1. A process for the preparation of toner particles which comprises adding to a melt mixing apparatus, or to an extrusion apparatus at least two polymers, one of which is incompatible with the other polymer, and pigment particles, melt mixing the aforementioned polymers and pigments, and separating the incompatible polymer domains with pigment particles from the resulting mixture.

2. A process in accordance with claim 1 wherein separation is accomplished by extraction.

3. A process in accordance with claim 1 wherein separation is accomplished by dissolving at least one of said polymer or polymers in water, alcohols, ketones, esters, nitriles, halocarbons, or hydrocarbons.

4. A process in accordance with claim 1 wherein separation of at least one of said polymer or polymers from the second incompatible polymer is effected by mechanical attrition.

5. A process in accordance with claim 1 wherein the pigment particles are carbon black, magnetite, cyan, yellow, magneta, red, blue, green, brown, or mixtures thereof.

6. A process in accordance with claim 1 wherein one polymer is insoluble in an alcohol.

7. A process in accordance with claim 1 wherein said incompatible polymer is selected from the group consisting of styrene acrylates, styrene methacrylates, styrene butadienes, polyesters, polyolefins, polycycloolefins, polyvinylbutyral, polyethylene acrylic acid (ester), polycaprolactones, polycarbonates, epoxies, phenolics, polyureas, polyesteramides, polyamides, and polyethers.

8. A process in accordance with claim 1 wherein said incompatible polymer has a melting point temperature of from about 50° to about 100° C.

9. A process in accordance with claim 1 wherein said incompatible polymer is selected from the group consisting of polyethyloxazoline, polyethylene oxide, phenolic, polypropylene oxide, polyvinylpyrrolidone, polyoxazolines, and gum arabic.

10. A process in accordance with claim 1 wherein the toner particles resulting are of an average particle diameter of from about 1 to about 20 microns.

11. A process in accordance with claim 1 wherein the toner particles resulting are of an average particle diameter of from about 5 to about 9 microns.

12. A process in accordance with claim 1 wherein the toner particles resulting possess a triboelectric charge of from about a positive 5 to about 40 microcoulombs per gram.

13. A process in accordance with claim 1 wherein the extrusion device is maintained at a temperature of from about 80° to about 250° C.

14. A process in accordance with claim 1 wherein said incompatible polymer is comprised of a styrene butadiene copolymer containing about 91 percent by weight of styrene, and about 9 percent by weight of butadiene.

15. A process in accordance with claim 1 wherein there is added to the apparatus a charge enhancing additive.

16. A process in accordance with claim 15 wherein the charge enhancing additive is selected from the group consisting of distearyl dimethyl ammonium methyl sulfate, distearyl dimethyl ammonium hydrogen sulfate, distearyl dimethyl ammonium bisulfate, cetyl pyridinium halides, and stearyl phenethyl dimethyl ammonium tosylates.

17. A process in accordance with claim 15 wherein the charge enhancing additive is selected from the group consisting of potassium tetraphenyl borate, colloidal silica, phosphonium salts, polyvinylpyridine treated carbon black, polydimethylamino methylmethacrylate, and iron salicylate.

18. A process in accordance with claim 15 wherein the charge enhancing additive is present in an amount of from about 0.05 percent by weight to about less than 5 percent by weight.

19. A process in accordance with claim 1 wherein the particles obtained can be selected for medical diagnosis, clinical biochemistry, affinity chromatography, xerography, mammography, liquid printing ink compositions, prostheses or cosmetics.

20. A process in accordance with claim 1 wherein the toner particles resulting possess a triboelectric charge of from about a negative 5 to about a negative 40 microcoulombs per gram.

21. A process in accordance with claim 1 wherein the toner particles resulting possess a triboelectric charge of from about a negative 10 to about a negative 45 microcoulombs per gram.

22. A process in accordance with claim 1 wherein the toner particles resulting possess a triboelectric charge of from about a positive 10 to about a positive 45 microcoulombs per gram.

23. A process in accordance with claim 1 wherein there results toner particles with an average particle diameter of from about 3 to about 20 microns.

* * * * *